July 31, 1956  J. MERCK ET AL  2,756,869
REPLACEABLE-FLIGHT CONVEYOR CHAIN
Filed Oct. 21, 1952
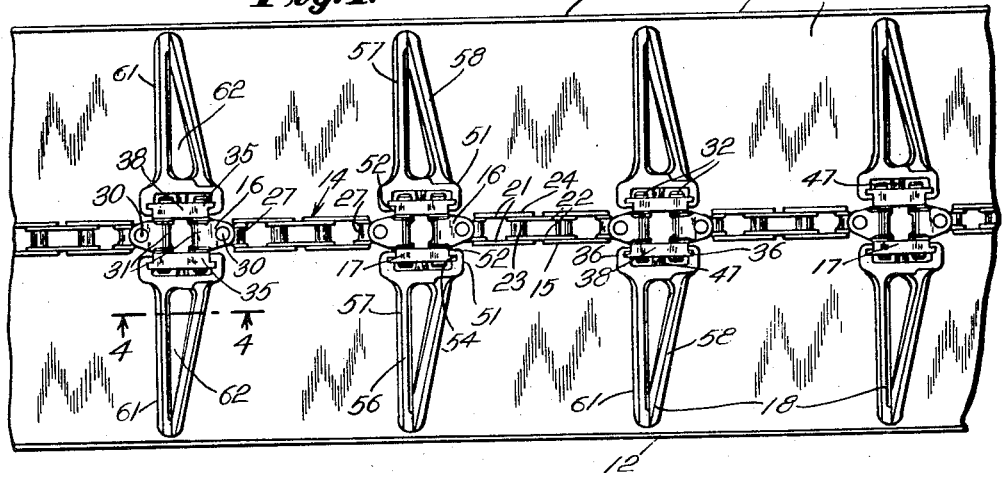
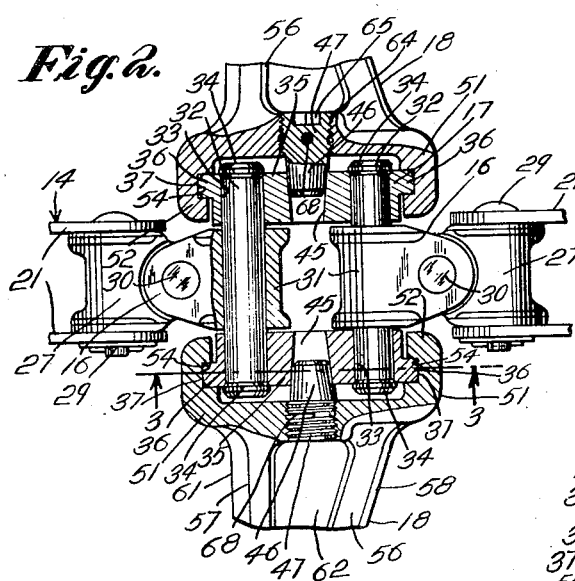
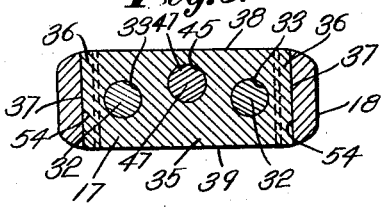
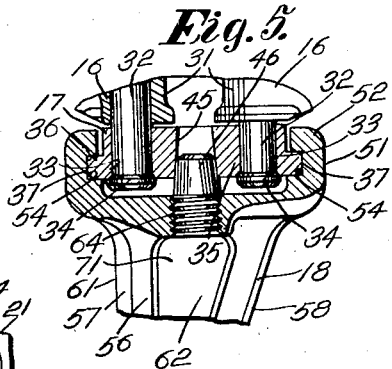
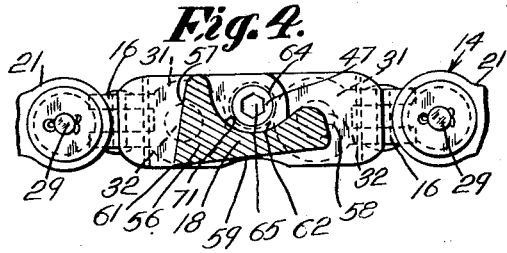
Inventors:
John Merck.
George C. Dalmaso.
by
Louis A. Maxam
Attorney.

United States Patent Office 2,756,869
Patented July 31, 1956

2,756,869

REPLACEABLE-FLIGHT CONVEYOR CHAIN

John Merck and George C. Dalmaso, Franklin, Pa., assignors to Joy Manufacturing Company, Pittsburgh, Pa., a corporation of Pennsylvania Application October 21, 1952, Serial No. 315,980

10 Claims. (Cl. 198—176)

Our invention relates to conveyor chains, and particularly to such chains of the replaceable-flight, center-chain type.

There is wide use, as, for example, on loading machines, continuous miners and the like, for conveyor chains which comprise a central chain, flexible both laterally and vertically, with flights extending oppositely from the opposite sides of the center chain. Such chains are frequently required to move very heavy masses of material such as large pieces of iron ore, large lumps of coal, etc. These large lumps are pushed along deck plates by the flights which move close to, or frequently in actual contact with, the deck plates. As the flights often apply push to such heavy masses at points rather far out toward their ends, very heavy bending stresses are imposed on the flights. Also, when loading from the bottom of a pile, large pieces of material may drop from a substantial height onto the flights. It will therefore be evident that bending of the flights, or even actual breakage is not at all uncommon, and so the need for a replaceable-flight chain is substantial.

It is desirable that the conveyor chain shall have its chain portion proper as strong as possible, and that replacment of flights shall not require disturbance of any element of the chain proper. It is further desirable, since the flights ought to be replaceable but at the same time require strong connection to the chain proper, that the connecting arrangements be as rugged and simple as possible, while at the same time supporting the flights solidly upon the chain.

In a preferred embodiment of the invention, a center chain having provision for both lateral and vertical pivoting of sections thereof may desirably be provided with side link elements permanently secured in assembled relation, as by suitable pivot pins, and having at their opposite ends flanges so arranged as to permit connection therewith, by a rectilinear movement, of the bases of flight elements. The flight elements will desirably have bases provided with projections having parallel bottomed grooves adapted to coact with the flanges on the side links. The interlocking connections thus provided will be adequate to withstand all the strains of use. The flights may desirably have slightly rearwardly inclined forward faces and slightly upwardly inclined bottoms, and be formed with their upper surfaces recessed or concave. There may be threaded openings formed in the bases of the flights for the reception of screws or other holding means having portions adapted to enter appropriately shaped openings in the side links of the chain proper. It will thus be noted that an additional abutment for taking up the longitudinal strains produced in use will be produced in use will be provided, while the structure of the interlocking parts will also hold the flight elements from possibility of unintended separation from the side links, and prevent any looseness.

It is an object of the present invention to provide an improved conveyor chain. It is another object of the invention to provide an improved conveyor chain of the flight type having replaceable flight elements. It is still another object of the invention to provide improved connecting means between replaceable flights and a flight-moving chain. It is a further object of the invention to provide improved flight structures per se. Other objects and advantages of the invention will hereinafter more fully appear.

In the accompanying drawings in which one illustrative embodiment and a minor modification of the invention are shown, Fig. 1 is a fragmentary top view of a portion of a flight conveyor chain and its associated trough.

Fig. 2 is an enlarged view with parts broken away showing a section of a central chain and of the adjacent ends of a pair of flights.

Fig. 3 is a longitudinal section on the plane of the line 3—3 of Fig. 2.

Fig. 4 is an enlarged longitudinal section, in terms of the chain as a whole, and a transverse section, so far as a flight is concerned, through a flight, on the plane of the line 4—4 of Fig. 1.

Fig. 5 is a fragmentary sectional view showing a slightly modified construction.

Figs. 1 to 4 inclusive illustrate one embodiment of the invention, and Fig. 5 a modification which differs from the first embodiment only in the employment of a locking screw which is not provided with a locking ring.

Referring first to Fig. 1, it will be observed that a conveyor trough 11 has side flanges 12 and a deck plate 13, and a conveyor chain generally designated 14 is adapted to traverse the upper surface of the deck plate 13 and move material along it, herein from right to left.

The chain 14 includes, as illustrated, sections of plain roller chain, these sections being numbered 15 and having universal joint connections 16 with mountings, in the form of special chain link elements 17, for flights 18. The sections 15 are made up of cooperating link elements 21 and 22, rollers 23 and connecting pins 24. At each end of a section 15, an element 27 of a universal joint connection 16 is connected by a horizontal pin 29 to a pair of the link elements 21. A vertical pin 30 connects the universal joint element 27 with another universal joint element 31. The universal joint elements 31 are pivotally supported on pin elements 32 which extend through openings 33 in the flight-mounting chain link elements 17, the pins 32 being suitably permanently attached to the elements 17 at 34, as by heading over, or welding.

The flight-mounting chain link elements 17 will be noted, referring to Fig. 2, to consist of link portions proper 35 carrying flanges 36 at their outer sides and, as shown, at their extreme ends. The flanges have parallel end surfaces 37 and parallel upper and lower surfaces respectively numbered 38 and 39. Intermediate the bores 33, there is a tapered bore 45 which is adapted to receive the tapered end 46 of a holding screw 47 later described. The flights 18 have bases 51 which have projecting portions 52 in which there are suitably formed or cut parallel grooves 54. These grooves are adapted to receive the flanges 36 and to be slid rectilinearly onto the flanges. The bases 51 carry flight portions (material-engaging and pushing portions) 56. These have forward faces 57 which extend substantially perpendicularly to the longitudinal center line of the chain though they are desirably given a slight rearward inclination, as best shown in Fig. 4. The flights have their rearward sides oblique, as indicated at 58, to the forward faces, so that the flights taper outwardly towards their free ends. The flights has slightly upwardly inclined bottom surfaces 59, and the surfaces 57 and 59 form a dihedral angle with each other whose edge 61 is in close adjacency to the deck plate 13. The flights have their upper surfaces formed, desirably forged, with substantial recesses 62, and the flight bases are drilled and tapped as at 64 for a holding screw 47 previously mentioned. The holding screw is provided with a socket 65 for enabling it to be rotated by a suitable wrench, and it has a tapered forward end 46, as previously mentioned, which enters the tapered bore 45. If desired, the holing screw may be provided with a split wire ring 68 for causing it to be frictionally locked in its bore. This type of holding screw is known as the "Hoy-type," and is used extensively by our assignee.

In order that the holding screw may be reached for adjustment, the recess in the top of the flights is made deep enough so that the central part 71 of the recess is below the level of the lower side of the tapped opening 64.

When the holding screw is tightened up, it will be evident that the flight is clamped rigidly to the link portions 35, but the parts may be readily detached, without taking any portion of the chain proper to pieces, should a flight be broken in use. The forward surfaces 57 of the flights push the material along the deck plate 13, and the edges 61 serve, in effect, as scrapers.

When it is desired to replace a flight, the holding screw 47 is backed out so that its tapered end wholly clears the opening 45. The flight may then be slid off the flanges 36, and a new flight be slid down over these flanges, and the holding screw on the new flight can be screwed in until the parts are locked together. The structure is rugged, consists of a minimum number of parts, and is easily handled in the field as well as in the factory.

The holding screw 47 of the modification of Fig. 5 is the same as that of Fig. 2, save that it is of a conventional form, rather than of the yieldingly locked "Hoy-type." Otherwise the modification of Fig. 5 is the same as the first form.

While there is in this application specifically described one form and a modification which the invention may assume in practice, it will be understood that this form and modification are shown for purposes of illustration, and that the invention may further be modified and embodied in various other forms without departing from its spirit or the scope of the appended claims.

What we claim is:

1. A flight for a conveyor chain having side plates, said flight including a base portion for the attachment of the flight to a side plate of a chain and a portion extending from said base portion and adapted to engage and move material, said last mentioned portion having its upper surface hollowed out and said base portion traversed by an opening for a holding element, said opening communicating fully with the hollow in said portion which extends from said base portion.

2. A flight for a conveyor chain having side plates, said flight including a base portion for the attachment of the flight to a side plate of a chain and a portion extending from said base portion and adapted to engage and move material, said base portion having at its opposite ends projections providing parallel-walled transversely extending grooves adapted to engage the opposite ends of a chain link, said last mentioned portion having a recess in its upper surface and said base portion a hole communicating with said recess and adapted to receive a holding element.

3. In a conveyor chain, link elements spaced apart to receive a sprocket tooth between them, pivot pins passing through said elements and projecting from the opposite sides thereof, side links one at each side of said link elements having at their opposite ends parallel transverse surfaces and traversed near their opposite ends by said pivot pins, said side links and link elements permanently held together by said pins, and a pair of conveyor flights extending outwardly from the opposite sides of said chain in the directions in which said pivot pins extend and detachably rigidly secured to said side links and contacting the latter at their opposite ends along said parallel transverse surfaces.

4. In a conveyor chain, link elements spaced apart to receive a sprocket tooth between them, pivot pins passing through said elements and projecting from the opposite sides thereof, side links one at each side of said link elements having at their opposite ends parallel transverse surfaces and traversed near their opposite ends by said pivot pins, said side links and link elements permanently held together by said pins, and a pair of conveyor flights extending outwardly from the opposite sides of said chain in the directions in which said pivot pins extend and detachably rigidly secured to said side links and contacting the latter at their opposite ends along said parallel transverse surfaces, said flights having bases engaging said side links, and said bases and side links traversed by openings and having holding elements engaged in said openings.

5. In a conveyor chain, link elements spaced apart to receive a sprocket tooth between them, pivot pins passing through said elements and projecting from the opposite sides thereof, side links one at each side of said link elements having at their opposite ends parallel transverse surfaces and traversed near their opposite ends by said pivot pins, said side links and link elements permanently held together by said pins, and a pair of conveyor flights extending outwardly from the opposite sides of said chain in the directions in which said pivot pins extend and detachably rigidly secured to said side links and contacting the latter at their opposite ends along said parallel transverse surfaces, said flights having bases engaging said side links, and said bases and side links traversed by openings and having holding elements engaged in said openings, and said flights having recesses with which the openings therein communicate and through which said holding elements are insertable and removable.

6. In a conveyor chain, link elements spaced apart to receive a sprocket tooth between them, pivot pins passing through said elements and projecting from the opposite sides thereof, side links one at each side of said link elements having at their opposite ends flanges providing parallel transverse surfaces and traversed near their opposite ends by said pivot pins, said side links and link elements permanently held together by said pins, a pair of conveyor flights extending outwardly from the opposite sides of said chain in the directions in which said pivot pins extend and detachably rigidly secured to said side links and contacting the flanges of the latter at their opposite ends along said parallel transverse surfaces, and locking screws threadedly engaging said flights and having portions entering said side links for holding them together.

7. In a conveyor chain, link elements spaced apart to receive a sprocket tooth between them, pivot pins passing through said elements and projecting from the opposite sides thereof, side links one at each side of said link elements having at their opposite ends flanges providing parallel transverse surfaces and traversed near their opposite ends by said pivot pins, said side links and link elements permanently held together by said pins, a pair of conveyor flights extending outwardly from the opposite sides of said chain in the directions in which said pivot pins extend and detachably rigidly secured to said side links and contacting the flanges of the latter at their opposite ends along said parallel transverse surfaces, and locking screws threadedly engaging said flights and having portions entering said side links for holding them together, said flights having their upper surfaces concaved to provide recesses for insertion of and access to said screws.

8. In a conveyor chain, link elements spaced apart to receive a sprocket tooth between them, pivot pins passing through said elements and projecting from the opposite sides thereof, side links one at each side of said link elements having at their opposite ends flanges providing parallel transverse surfaces and traversed near their opposite ends by said pivot pins, said side links and link elements permanently held together by said pins, a pair of conveyor flights extending outwardly from the opposite sides of said chain in the directions in which said pivot pins extend and detachably rigidly secured to said side links and having undercut portions contacting the flanges of the latter at their opposite ends along said parallel transverse surfaces, and locking screws threadedly engaging said flights and having portions entering said side links for holding them together, said flights having their upper surfaces concaved to provide recesses for insertion of and access to said screws.

9. In a conveyor chain, link elements spaced apart to receive a sprocket tooth between them, pivot pins passing through said elements and projecting from the opposite sides thereof, side links one at each side of said link elements having at their opposite ends parallel transverse surfaces and traversed near their opposite ends by said pivot pins, said side links and link elements permanently held together by said pins, and a pair of conveyor flights extending outwardly from the opposite sides of said chain in the directions in which said pivot pins extend and detachably rigidly secured to said side links and contacting the latter at their opposite ends along said parallel transverse surfaces, said flights having bases engaging said side links, and said bases and side links traversed by openings midway between the ends thereof and having holding elements engaged in said openings.

10. In a conveyor chain, link elements spaced apart to receive a sprocket tooth between them, pivot pins passing through said elements and projecting from the opposite sides thereof, side links one at each side of said link elements having at their opposite ends flanges providing parallel transverse surfaces and traversed near their opposite ends by said pivot pins, said side links and link elements permanently held together by said pins, a pair of conveyor flights extending outwardly from the opposite sides of said chain in the directions in which said pivot pins extend and detachably rigidly secured to said side links and contacting the flanges of the latter at their opposite ends along said parallel transverse surfaces, and locking screws threadedly engaging said flights at points midway between the ends of the latter and having portions entering said side links for holding them together.

References Cited in the file of this patent

UNITED STATES PATENTS

| | | |
|---|---|---|
| 1,770,650 | Levin | July 15, 1930 |
| 1,850,686 | Pangborn | Mar. 22, 1932 |
| 2,372,925 | Ball | Apr. 3, 1945 |
| 2,435,768 | Biggs | Feb. 10, 1948 |
| 2,450,501 | Clarkson | Oct. 5, 1948 |
| 2,544,191 | Tomfohrde | Mar. 6, 1951 |